United States Patent [19]

Strittmatter

[11] Patent Number: 4,741,617
[45] Date of Patent: May 3, 1988

[54] METHOD AND APPARATUS FOR MEASURING, MAGNIFICATION POWER OF A MAGNIFYING AID

[75] Inventor: Donald J. Strittmatter, Tucson, Ariz.

[73] Assignee: Hughes Aircraft Company, Los Angeles, Calif.

[21] Appl. No.: 929,022

[22] Filed: Nov. 10, 1986

[51] Int. Cl.⁴ .............................................. G01B 9/00
[52] U.S. Cl. ................................. 356/124; 356/125
[58] Field of Search ........................ 356/124, 125, 126

[56] References Cited

U.S. PATENT DOCUMENTS 3,375,754  4/1968  Kugler ................................. 356/125
4,203,666  5/1980  Ii et al. ................................ 356/124

Primary Examiner—Eugene R. Laroche
Assistant Examiner—James C. Lee
Attorney, Agent, or Firm—Charles D. Brown; A. W. Karambelas

[57] ABSTRACT

An apparatus (10) for measuring the magnification power of a magnifying aid (14) is disclosed. The apparatus (10) includes an optical system (12) having an objective lens (34) focused at infinity on a reticle. The reticle (20) is positioned in the line of sight of the optical system (12). The reticle (20) is precalibrated such that the magnification power of a magnifying aid (14) may be determined. Also, disclosed is a method of calibrating the optical system (12) and a method of measuring the magnification power of a magnifying aid (14).

8 Claims, 2 Drawing Sheets

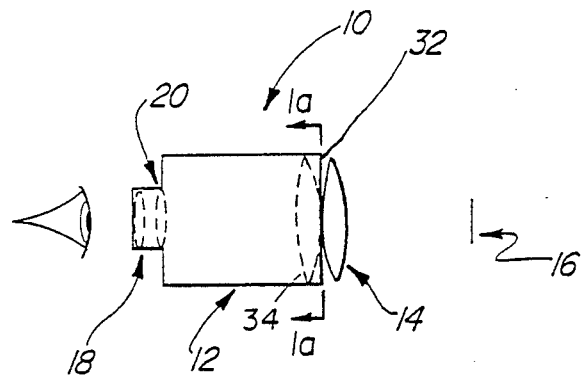
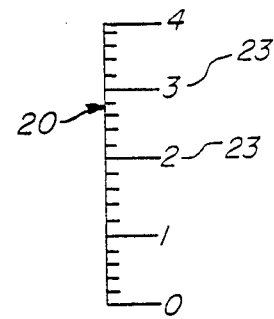
Fig. 1.  Fig. 5.
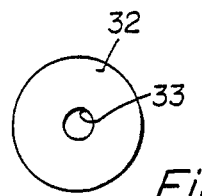
Fig. 1a.
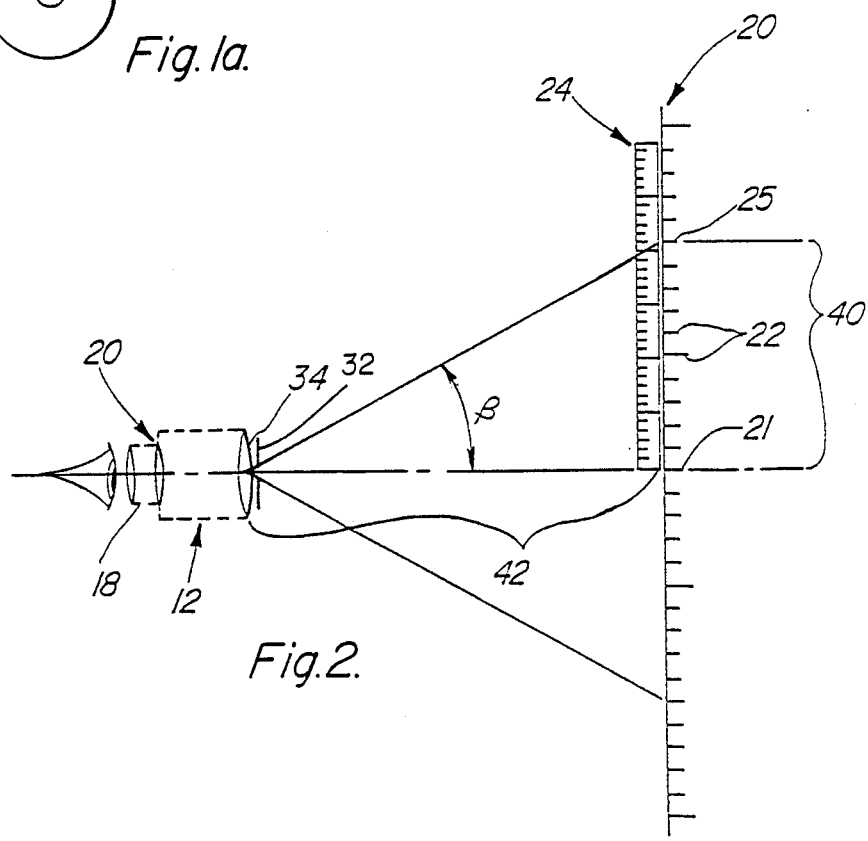
Fig. 2.

METHOD AND APPARATUS FOR MEASURING, MAGNIFICATION POWER OF A MAGNIFYING AID

BACKGROUND OF THE INVENTION

1. Field of the Invention

The present invention relates to measuring the magnification power of magnifying aids and more particularly to an apparatus and method for determining unknown magnification powers of magnification aids.

2. Description of Related Art

Presently in the magnifier industry there does not exist a standard definition of magnifying power nor a standard method for measuring the magnification power of magnifying aids, such as lenses. Generally, magnifiers are marked or labeled with predetermined or designated magnification powers, however, these listed magnification powers are generally incorrect. Certain industries, such as the soldering industry, require that specific magnification powers be used when inspecting connections or components. Generally, magnifiers that are used out in the field cannot easily be field checked to determine, if indeed the magnification power listed on the magnifier is the true magnification power of the magnifier. Thus, in many industries magnifiers having improper magnification power are used for inspection. This results in improper inspection of the components which ultimately affects the quality and reliability of the components.

Presently, devices for measuring the magnification powers of magnifying aids have been limited to expensive special testing equipment which is generally found only in an optical laboratory. This testing equipment is highly complex, expensive, nonportable and requires an optical technician to test for the magnification power of the magnifier. The user of a magnifying aid who desires to determine its magnification power must send the magnifying aid to an optical laboratory to have the magnification power determined. This process is very time consuming, expensive, and expends valuable time when the user is not able to utilize the magnifying aid.

SUMMARY OF THE INVENTION

Accordingly, the present invention overcomes the disadvantages of the heretofore used devices and methods by providing a new and improved apparatus for measuring the magnification power of a magnifying aid out in the field. The present invention is portable, inexpensive, and capable of being used by non-optically trained operators. The present invention also enables magnifying aids to be field checked without any optical laboratory facility requirement. Thus, the present invention enables unknown magnification powers of magnifying aids to be determined quickly and accurately out in the field.

The apparatus includes an optical system having an objective lens which is apertured down to the size of the pupil of a human eye. A reticle is located at the rear focal plane of the objective lens. The apparatus also includes an eyepiece which is focussable on the reticle which is also positioned in the line of sight of the eyepiece. The reticle may be calibrated to determine the magnification power of a magnifying aid when a measuring scale of known size is viewed through the combination of the optical system and the magnifying aid. The optical system is calibrated such that a predetermined angle is associated with each unit mark of the reticle. The reticle unit mark, having a predetermined angle, is superposed upon the image of the measuring scale, which has unit marks corresonding to predetermined angles, such that the predetermined reticle angles and measuring scale angles may be ratioed to calibrate the magnification power of the magnifying aid. If the reticle mark spacing and measuring scale spacing are chosen correctly, the magnification power may be read directly off the reticle.

Also disclosed is a method of measuring the magnification power of a magnifying aid which uses the above described optical system. The method includes: providing a magnifying aid which is to have its magnifying power measured; positioning the magnifying aid in the viewing line of the optical system; viewing and focusing a presized scale through the optical system and magnifying aid; comparing the calibrated reticle unit marks with the presized scale units marks; and determining the magnification power of the magnifying aid.

From the subsequent description and the appended claims taken in conjunction with the accompanying drawings, other objects and advantages of the present invention will become apparent to one skilled in the art.

BRIEF DESCRIPTION OF THE DRAWINGS

In the accompanying drawings:

FIG. 1 is a side elevational view of an apparatus in accordance with the present invention.

FIG. 1a shows a front view of the aperture disc illustrating the preferred placement of the aperture.

FIG. 2 is a schematic view illustrating calibration of the apparatus in accordance with the present invention.

FIG. 5 shows a portion of a calibrated reticle having precalibrated magnifying powers indicated thereon.

DESCRIPTION OF THE PREFERRED EMBODIMENT

Figure 3:
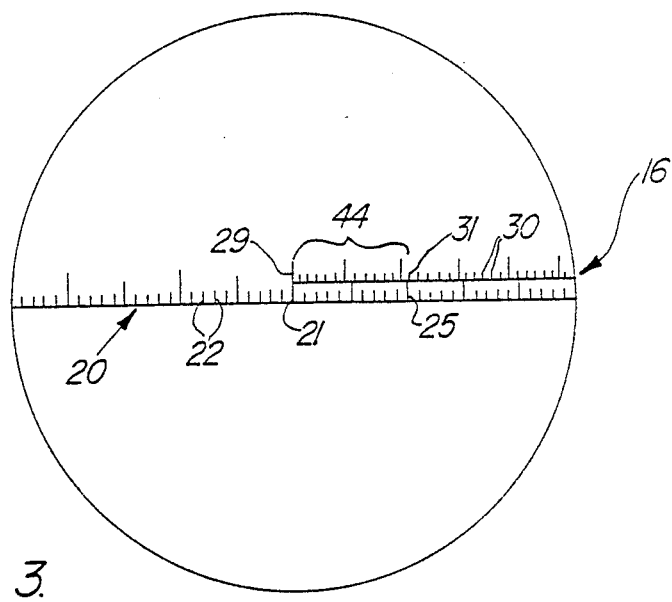
FIG. 3 is a plan view as seen through the apparatus of FIG. 1.

Referring to FIG. 1, an apparatus for measuring the magnification power of a magnifying aid is shown and designated with the reference numeral 10. The apparatus 10 generally includes an optical system (12) and a measuring (or target) scale (16) of known size.

The optical system (12) generally includes an eyepiece (18) having a reticle (20) positioned in the eyepiece (18). The objective lens (34) is focused at infinity on the reticle (20) and any such optical system which can be focused at infinity may be utilized in the apparatus of the present invention; preferably a telescope or monocular focused at infinity is used. A telescope which works satisfactorily in the present invention is a No. 14 Walters 8×30 Monocular with Grid, distributed by S. Walters, Inc., 32208 Oak Shores Drive, West Lake Village, Calif. The eyepiece (18) is focused onto the reticle (20) so that the reticle is in sharp focus to the user when viewed through the optical system (12). Generally, an aperture disc (32), having a small aperture (33) for simulating the pupil of the eye, is positioned adjacent to the objective lens (34) of the optical system (12). The aperture disc acts as an aperture stop for limiting the amount of light entering the objective lens to that amount which would enter the pupil of the eye of a user. When using the optical system (12) to measure the magnifying power of a magnifying aid (14) the magnifying aid is positioned adjacent the objective lens (34) of the optical system, and the target scale (16) is placed at the focal point of the combination of the optical system (12) and magnifying aid (14) (i.e., at "infinity").

Magnification power may be defined as the ratio of the tangent of two half-angles subtended by an object under two different conditions. The first half-angle (a reference angle) is the half-angle subtended by the object as viewed by the human eye at a distance of 10 inches from the object. The ten inches is used to provide a standard of reference and is an appropriate distance since it is generally accepted that 10 inches is statistically the closest distance at which the human eye can focus. The second half-angle is the apparent half-angle subtended by the object when viewed by the human eye through the optical aid. If the magnifying aid has a power greater than unity, the second half-angle will be greater than the first, and the magnifying power of the aid can be calculated as the ratio of the tangent of the second half-angle divided by the tangent of the first half-angle. However, if this method is to produce repeatable results with acceptable accuracy, a calibrated optical system must be utilized to accurately measure the two half-angles. The optical system (12) is intended to provide that capability.

CALIBRATION OF THE RETICLE UNIT MARKS OF THE OPTICAL SYSTEM

Generally, the optical system (12) is calibrated such that each of the unit marks (22) on reticle (20) corresponds with a known predetermined half-angle. Turning to FIG. 2, the optical system (12) is shown positioned at a predetermined distance (42), which is equivalent to infinity for the optical system (12) being used, from a measurement device (24), such as a precision scale. The center mark (21) of the reticle (20) is positioned such that one end (preferably the bottom end) of the measurement device (24) is aligned with the center mark (21) of the reticle (20). This determines a starting point for calculating the half-angles corresponding to each unit mark (22) of the reticle (20). The reticle (20) is calibrated by measuring the distance (40) subtended from a chosen unit mark (25) to the center mark (21) of the reticle (20). This distance (40) between the chosen unit mark (25) and center mark (21) is used to calibrate the tangent of the half-angle corresponding to the chosen unit mark (25) on the reticle (20) as viewed through the optical system (12). The tangent of the half-angle for the chosen unit mark (25) on the reticle (20), is determined by taking the distance (40) measured on measurement device (24) and corresponding to the distance on the reticle from the center mark (21) of the reticle (20), to the chosen unit mark (25) on the reticle (20), and dividing that distance (40) by the distance (42) from the optical system (12) to the measuring member (24), which should be equal to at least 500 times the focal length of the optical system objective (34). Such a distance is equivalent to "infinity" for the optical system (12) being used. Each unit mark (22), of the reticle (20), is similarly calibrated to determine its corresponding half-angle. Now, the tangent of the reticle marks, referred to hereinafter as tan β, may be utilized in the determination of the magnification power of a magnifying aid.

MEASURING MAGNIFYING POWER OF AN OPTICAL AID

The calibrated optical system (12) is generally positioned as shown in FIG. 1 with the aperture (33) placed in the same location as the user's eye would be when using the magnifying aid (14). The target scale (16) of known size is positioned in the line of sight of the optical system (12) and magnifying aid (14). The target scale (16) has a plurality of equally spaced unit marks (30). The optical system (12) and magnifying aid (14) are moved together in and out along the optical line of sight until the target scale (16) comes into focus. (FIG. 3.) Once the target scale (16) is in focus the angle subtended by the target scale (16) (or any of its unit marks) on the reticle (20) may be determined. The center mark (21), of the reticle (20), is aligned at the starting edge (29) of the target scale (16). A measurement is taken from the starting edge (29) of the scale (16), to a chosen unit mark (31) on the target scale (16), which corresponds to a chosen unit mark (25), having a previously calibrated angle, on the reticle (20) pattern. Once the length of the distance (44) on the target scale (16) has been determined, the tangent for the angle subtended by the magnifying aid (14) may be determined. The tangent of the second half-angle for the chosen unit mark (25) on the reticle (20), hereinafter referred to as Tan α, is determined by dividing the distance (44) measured on the target scale (16), in inches, by ten (10) inches. The ten (10) inch length corresponds to the normal closest focusing distance of the human eye. Now, Tan α may be utilized in the determination of the magnification power of magnifying aid (14).

The magnification power of the magnifying aid (14) is determined by driving the Tan β by Tan α, both of which are calculated as described. Magnification power can be determined as follows:

$$MP = \frac{TAN\ \beta}{TAN\ \alpha}$$

$$\text{Tan } \beta = \frac{\text{Distance (40) as measured on measuring member (24) corresponding to the distance from chosen reticle mark (25) to center reticle mark (21)}}{\text{distance (42) from optical system (12) to measuring member (24)}}$$

$$\text{Tan } \alpha = \frac{\text{Distance (44) measured on the target scale (16) corresponding to the distance from the chosen unit mark (31) (which corresponds to the chosen mark (25) on the reticle (20) used in Tan } \beta \text{ above) to the starting edge (29) of the target scale.}}{10}$$

wherein the distance measurements are in inches. Also, since the size of the target scale (16) is known, magnificant powers (23) may be directly positioned onto a calibrated reticle (20) as illustrated in FIG. 5. This is accomplished by substituting known magnification powers (e.g. 1, 2, 3, 4, 5 etc.) and solving for the unit reticle size and positioning the known magnification powers on the reticle at desired unit marks (22). Therefore, the magnification power can be directly positioned (printed) onto the reticle (20) of the optical system (12) and magnification power may be determined by viewing a predetermined size target scale through the optical system (12) and magnifying aid (14).

To illustrate the simplicity and ease of use of such a reticle with precalibrated magnification powers indicated on reticle, consider the following. The magnifying aid of unknown power is positioned with respect to the aperture of the optical system in the same position as would be the eye of a user of the magnifying aid. The combination of the optical system and magnifying aid are moved back and forth along the optical axis until the precision measuring target scale is brought into focus. A preselected length of said precision target scale is measured against the divisions (unit marks) of the reticle. If the selected length of the precision scale extends from the center of the reticle to the unit mark on the reticle marked with a 5, then the magnifying power of the magnifying aid is 5. This procedure is particularly easy to use and only requires that the selected length on the measuring target scale as viewed through the combination of the optical system and magnifying aid be the same length as would be seen through the optical system alone as extending from the center of the reticle to the unit mark indicating unity power. Thus, a non-optically trained operator can determine unknown magnification power of a magnifying aid by viewing a predetermined sized target scale (16) through the combination of the apparatus (10) and magnifying aid (14) of unknown magnifying power and reading the power off the precalibrated reticle.

Calibration Example

The following is an example for calibrating an apparatus in accordance with the present invention. The example is included for illustration purposes only and is not intended to be viewed as limiting the scope of the present invention. Corresponding elements are designated with corresponding reference numerals which have been primed.

Figure 4:
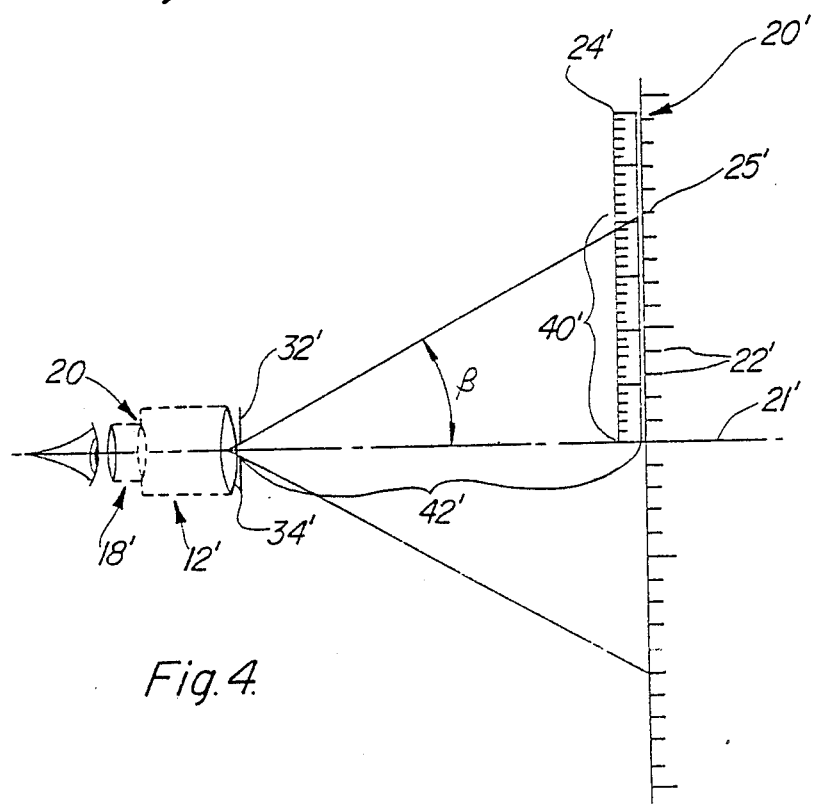
FIG. 4 is a schematic view illustrating calibration of an apparatus in accordance with the present invention.

An 8×30 monocular having a usable target reticle already focused at infinity was chosen as the optical system (12') (See FIG. 4). An aperture disc (32') having a four to five millimeter diameter aperture was placed in front of the telescope's objective lens (34') for simulating the observer's eye pupil size when measuring magnifying aids. This aperture also reduces parallax error when calibrating the optical system. A precision scale (24') was positioned 6,000 inches away from the objective lens (34') of the telescope, as shown in FIG. 4. An object distance (40') is taken. The object distance (40') corresponds to a length on the precision scale (24') equal to the distance from the center mark (21') of the reticle (20') to the desired chosen mark (25') on the reticle. Tan $\beta$, is found by taking the object distance (40') and dividing by the distance (42') from the telescope (12') to the precision scale (24'). In this case, the object distance (40') equaled 75 inches. Tan $\beta$ was found by dividing the object distance (40'), 75 inches, by the distance (42') between the telescope and precision scale, which is 6,000 inches. Tangent beta is equal to 0.0125; which is 75 divided by 6,000. The optical system (12') is now calibrated and ready for use in determining the unknown magnification powers of magnifying aids.

The optical system (12) is positioned so that its aperture (33) is placed where the eye of the user would have been when using the magnifying aid (14) to be calibrated as seen in FIG. 1. A target scale (16) is positioned at the focal point of the apparatus (10). The target scale (16) used was a 0.1 inch linear scale reticle with 100 divisions of 0.001 inch increments. Such a target scale may be obtained from a number of commercial suppliers. The scale (16') is viewed through the optical system (12) and magnifying aid (14) (See FIG. 3). The target scale distance (44) between the center mark (21) of the reticle (20) and the chosen mark (25) of the reticle (20) is determined. This target scale distance (44) measured for the particular magnifying aid (14) was equal to 0.0125 inch. Tangent alpha is determined by dividing the target scale distance (44) by ten (10) inches. Thus, tangent alpha is equal to 0.00125. Now that tangent alpha and tangent beta are known, the magnification power may be calculated. Magnification power (MP) is equal to tangent beta divided by tangent alpha. Thus, for this case the magnification power is equal to 0.0125 (which is 75 divided by 6,000), divided by 0.00125 (which is 0.0125 divided by 10). Therefore, magnification power can be determined for this particular magnifying aid (14) by dividing 0.0125 by 0.00125 which gives a magnification power of 10 for the magnifying aid (14). By using a target scale of known size the magnifying power can be read directly off the reticle (20) as any value of magnifying power per division (22) on the reticle that subtends the calibrated distance (44) on the target scale (16).

While the above summarizes the present invention, it will become apparent to those skilled in the art that modifications, variations, and alterations may be made without deviating from the scope and fair meaning of the present invention as described in the subjoined claims.

What is claimed is:

1. An optical apparatus, for use in conjunction with a precision scale, for measuring the magnification power of a magnifying aid comprising:
    an eyepiece (18) which is focusable on a reticle (20) positioned in the line of sight of the eyepiece;
    an objective lens (34) positioned in the line of sight of the apparatus and focused at infinity;
    an aperture (33) approximately the size of the pupil of the human eye and placed adjacent the objective lens (34); and
    said reticle having a plurality of division marks (22) at least one of which has been calibrated as subtending a measured half-angle from the center of said reticle.

2. The apparatus of claim 1 wherein said apparatus is a telescope.

3. The apparatus of claim 2 wherein said aperture (33) is formed in an aperture disc (32) which is placed over the end of the telescope containing the objective lens (34).

4. The apparatus of claim 1 wherein said aperture (33) is placed adjacent the center of the objective lens (34).

5. The apparatus of claim 1 wherein said reticle (20) is positioned in said eyepiece (18).

6. A method for measuring the magnification power of a magnifying aid comprising the steps of:
    (a) providing an optical apparatus (12) comprising
        an eyepiece (18) which is focusable on a reticle (20) positioned in the line of sight of the eyepiece;
        an objective lens (34) positioned in the line of sight of the apparatus and focused on reticle (20);
        an aperture (33) approximating the size of the pupil of the human eye and located adjacent the objective lens (34);
        said reticle having a plurality of division marks (22) at least one of which has been calibrated as subtending a measured half-angle from the center of said reticle;
    (b) providing a precision target scale (16);

(c) providing a magnifying aid;
(d) placing said aperture in the same position with respect to said magnifying aid as would be the eye of a user of said magnifying aid;
(e) moving the combination of said optical apparatus and magnifying aid relative to said precision target scale until said scale is in focus;
(f) measuring the half-angle subtended by known reference points of said target scale when viewed through said combination; and
(g) comparing the measured half-angle with the half-angle known to be subtended by said reference points when viewed at the statistically normal closest focus distance of the human eye.

7. A method for calibrating an optical apparatus for measuring the magnification power of magnifying aids, said method comprising:
(a) providing an optical apparatus (12) having an objective lens (34) focused at infinity on a reticle (20) and an eyepiece (18) focused on the same reticle (20) having a plurality of division marks (22);
(b) providing a precision scale (24) located at a measured distance (42) from said optical apparatus, equivalent to infinity;
(c) viewing said precision scale through said optical apparatus such that a correlation can be made between a known distance as measured on said precision scale and a chosen division (25) on said reticle (20) when the center (21) of the reticle is aligned with one end of the scale and the chosen division mark (25) is aligned on the other end of said known distance;
(d) calculating the tangent of the one-half angle associated with said chosen division mark (25) by dividing the measured distance on said precision scale by the measured distance (42) from the scale to the optical apparatus.

8. An optical apparatus for measuring the magnification power of a magnifying aid comprising:
an eyepiece (18) which is focusable on a reticle (20) positioned in the line of sight of the eyepiece;
an objective lens (34) positioned in the line of sight of the apparatus and focused at infinity on the reticle (20);
an aperture disc (32) placed over the objective lens having an aperture (33) therein approximately the size of the pupil of the human eye;
said reticle having a plurality of division marks (22) at least one of which has been pre-calibrated and labeled with a corresponding magnification power; and
a precision target scale (16) placed along the optical axis of said optical apparatus at a distance equivalent to the infinity focus point of said optical apparatus.

* * * * *